US012563629B2

(12) United States Patent
Dai et al.

(10) Patent No.: US 12,563,629 B2
(45) Date of Patent: Feb. 24, 2026

(54) SECONDARY CELL GROUP CONFIGURATION METHOD AND APPARATUS

(71) Applicant: Huawei Technologies Co., Ltd., Shenzhen (CN)

(72) Inventors: Bei Dai, Wuhan (CN); Xianzhuan Hu, Wuhan (CN); Xianting Qi, Nanjing (CN); Hao Zhang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 383 days.

(21) Appl. No.: 18/246,639

(22) PCT Filed: Sep. 16, 2021

(86) PCT No.: PCT/CN2021/118692
§ 371 (c)(1),
(2) Date: Mar. 24, 2023

(87) PCT Pub. No.: WO2022/063015
PCT Pub. Date: Mar. 31, 2022

(65) Prior Publication Data
US 2024/0040653 A1    Feb. 1, 2024

(30) Foreign Application Priority Data
Sep. 27, 2020    (CN) .......................... 202011037346.0

(51) Int. Cl.
*H04W 76/20*        (2018.01)
*H04W 76/30*        (2018.01)

(52) U.S. Cl.
CPC ........... *H04W 76/20* (2018.02); *H04W 76/30* (2018.02)

(58) Field of Classification Search
CPC . H04W 76/20; H04W 76/30; H04W 36/0058; H04W 8/22; H04W 76/15;
(Continued)

(56) References Cited

U.S. PATENT DOCUMENTS

2019/0045568 A1* 2/2019 Palat ...................... H04W 76/27
2020/0008256 A1* 1/2020 Wu ......................... H04W 76/27
(Continued)

FOREIGN PATENT DOCUMENTS

| CN | 107690154 A | 2/2018 |
| CN | 111436073 A | 7/2020 |
| EP | 3585129 A1 | 12/2019 |

*Primary Examiner* — Will W Lin
(74) *Attorney, Agent, or Firm* — Slater Matsil, LLP

(57) ABSTRACT

This application provides a secondary cell group configuration method and apparatus. The method includes: receiving an LTE RRC reconfiguration message, where the LTE RRC reconfiguration message includes an NR configuration parameter, and the NR configuration parameter is used to configure an SCG; sending indication information when a terminal device does not support a configuration of the SCG, where the indication information is used to indicate that the SCG is abnormal. After receiving the indication information, if the network device determines that the terminal device needs to release the SCG, the network device may indicate the terminal device to release the SCG.

20 Claims, 5 Drawing Sheets

(58) Field of Classification Search
CPC ..... H04W 76/34; H04W 76/19; H04W 24/02;
H04W 24/10
See application file for complete search history.

(56) References Cited

U.S. PATENT DOCUMENTS

| 2020/0323007 A1 * | 10/2020 | Teyeb .................... H04W 76/19 |
|---|---|---|
| 2021/0037405 A1 * | 2/2021 | Bae ....................... H04W 24/10 |
| 2022/0386190 A1 * | 12/2022 | Zhao ..................... H04W 76/19 |
| 2024/0349334 A1 * | 10/2024 | Babaei ............. H04W 74/0808 |

* cited by examiner

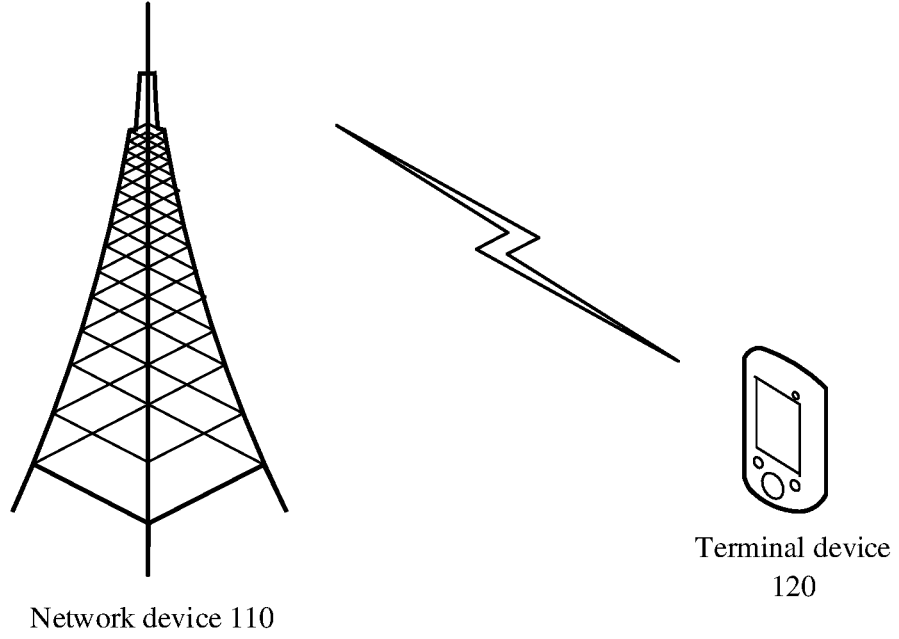

Terminal device
120

Network device 110

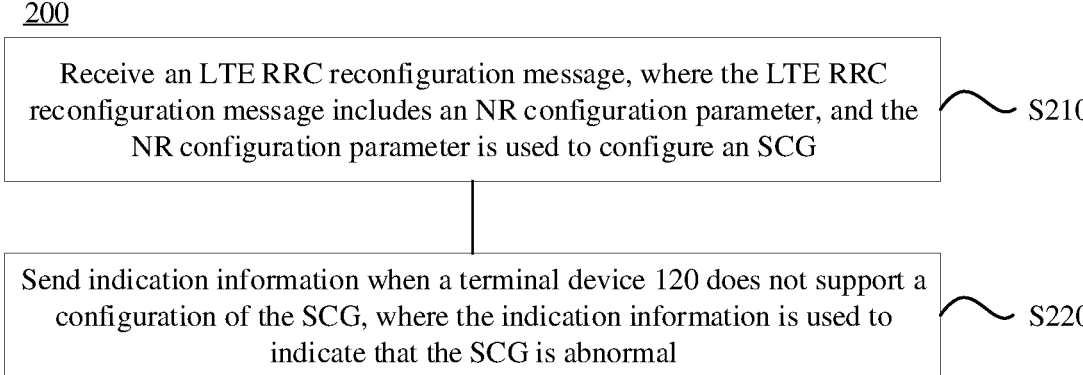

Receive an LTE RRC reconfiguration message, where the LTE RRC reconfiguration message includes an NR configuration parameter, and the NR configuration parameter is used to configure an SCG          S210

Send indication information when a terminal device 120 does not support a configuration of the SCG, where the indication information is used to indicate that the SCG is abnormal          S220

FIG. 2

5G bandwidth configured
by a network device 110

5G bandwidth that
is not supported
by a terminal
device 120

5G bandwidth supported by the
terminal device 120

5G frequency

Apparatus 500

Sending unit — 520

Processing unit — 510

Receiving unit — 530

SECONDARY CELL GROUP CONFIGURATION METHOD AND APPARATUS

CROSS-REFERENCE TO RELATED APPLICATIONS

This application is a National Stage of International Application No. PCT/CN2021/118692, filed on Sep. 16, 2021, which claims priority to Chinese Patent Application No. 202011037346.0, filed on Sep. 27, 2020, both of which are hereby incorporated by reference in their entireties.

TECHNICAL FIELD

This application relates to the communications field, and in particular, to a secondary cell group configuration method and apparatus.

BACKGROUND

To smoothly replace a network technology, a 5th generation (5th generation, 5G) network and a 4th generation (4th generation, 4G) network coexist for a long period of time. In this case, a networking manner is a non-standalone (non-standalone, NSA) networking manner.

In an NSA networking manner, a secondary cell group (secondary cell group, SCG) is added by using the 4G network. The SCG is a 5G network. In the NSA networking manner, a terminal device maintains a dual connection to the 4G network and the 5G network. For example, after determining that the terminal device has a 5G capability, a network device sends a 4G radio resource control (radio resource control, RRC) reconfiguration message to the terminal device. The 4G RRC reconfiguration message includes a 5G frequency. The terminal device measures the 5G frequency based on an indication of the 4G RRC reconfiguration message, and attempts to add an SCG.

Because a 5G frequency band is wide, the terminal device may not support a 5G bandwidth configured by the network device. When the terminal device does not support the 5G bandwidth configured by the network device, the terminal device needs to send a 4G RRC re-establishment message to the network device, to re-establish a 4G network connection. After receiving the 4G RRC re-establishment message, the network device cannot determine whether the terminal device supports a 5G frequency indicated by the 4G RRC reconfiguration message, and configures an SCG for the terminal device again, and the terminal device also re-establishes a 4G network connection again. Consequently, the 4G network connection is frequently re-established, affecting communication quality.

SUMMARY

This application provides an SCG configuration method, to avoid frequently re-establishing a 4G network connection.

According to a first aspect, an SCG configuration method is provided, including: A terminal device receives a long term evolution (long term evolution, LTE) RRC reconfiguration message. The LTE RRC reconfiguration message includes a new radio (new radio, NR) configuration parameter, and the NR configuration parameter is used to configure an SCG. The terminal device sends indication information when the terminal device does not support a configuration of the SCG. The indication information is used to indicate that the SCG is abnormal.

That the terminal device does not support a configuration of the SCG may be explained as follows: Matching between a bandwidth supported by the terminal device and a bandwidth in the NR configuration parameter fails. After receiving the indication information, if the network device determines that the terminal device needs to release the SCG, the network device may send an SCG release message to the terminal device. After releasing the SCG, the terminal device does not need to send a 4G network re-establishment request again, to avoid frequently re-establishing a 4G network connection, or reduce a quantity of times of frequently re-establishing a 4G network connection, and improve network connection quality.

Optionally, the method further includes: The terminal device releases the SCG when the terminal device receives an SCG release message in a target time period; or the terminal device sends an LTE RRC re-establishment message when the terminal device does not receive an SCG release message in a target time period.

After the terminal device sends the indication information, the network device requires a specific period of time for making a decision. Therefore, signaling overheads can be reduced if the terminal device does not send the LTE RRC re-establishment message in the target time period. If the terminal device still receives no SCG release message after the target time period, there is a possibility that the network device does not make a decision in a timely manner because the network device has a busy task. The terminal device may send the LTE RRC re-establishment message to the network device, to re-establish the 4G network connection as soon as possible, and reduce impact of an SCG configuration failure on communication.

Optionally, the target time period is a time period corresponding to a timer started after the indication information is sent.

The timer may be started immediately after the indication information is sent, or may be started after a period of time after the indication information is sent. The terminal device may flexibly set the target time period by using the timer.

Optionally, the method further includes: when a quantity of times that matching between the bandwidth supported by the terminal device and the bandwidth in the NR configuration parameter fails is greater than or equal to a first threshold, determine not to report a measurement report of the SCG any longer.

When a quantity of times that matching of a combination of an LTE cell and an NR cell corresponding to the SCG fails is greater than or equal to the first threshold, it indicates that the terminal device does not support the combination of the LTE cell and the NR cell. In this case, the terminal device stops reporting the measurement report, to prevent the network device from configuring the SCG for the terminal, so as to avoid frequently re-establishing a 4G network connection, or reduce a quantity of times of frequently re-establishing a 4G network connection, and improve network connection quality. In addition, in this case, the terminal device may stop measurement, to reduce power consumption of the terminal device.

Optionally, the method further includes: The terminal device determines, based on combination information, the quantity of times that matching fails. The combination information includes: at least one piece of information of a frequency band identifier (identifier, ID), a frequency ID, and a physical cell ID of an LTE cell, and at least one piece of information of a frequency band ID, a frequency ID, and a physical cell ID of an NR cell.

Optionally, the indication information is NR SCG failure information.

The NR SCG failure information is currently existing information, but is not applied to a scenario in which configuring an NR SCG by using the LTE RRC reconfiguration message fails. The existing information is used to indicate that the SCG is abnormal in the scenario, without a need to design new information, to help reduce communication complexity.

According to a second aspect, this application provides an SCG configuration apparatus, including units configured to perform the method according to the first aspect. The apparatus may be a terminal device, or may be a chip in the terminal device. The apparatus may include a receiving unit, a sending unit, and a processing unit.

When the apparatus is a terminal device, the processing unit may be a processor, and the receiving unit and the sending unit may be a transceiver. The terminal device may further include a processing unit and a storage unit, and the storage unit may be a memory. The storage unit is configured to store instructions, and the processing unit executes the instructions stored in the storage unit, so that the terminal device performs the method according to the first aspect.

When the apparatus is a chip in the terminal device, the processing unit may be a processing unit inside the chip, and the input unit may be an input/output interface, a pin, a circuit, or the like. The processing unit executes the instructions stored in the storage unit, so that the chip performs the method according to the first aspect. The storage unit may be a storage unit (for example, a register or a cache) in the chip, or may be a storage unit (for example, a read-only memory or a random access memory) located outside the chip.

According to a third aspect, this application provides a computer-readable storage medium. The computer-readable storage medium stores a computer program, and when the computer program is executed by a processor, the processor is enabled to perform the method according to the first aspect.

According to a fourth aspect, this application provides a computer program product. The computer program product includes computer program code, and when the computer program code is run by a processor, the processor is enabled to perform the method according to the first aspect.

BRIEF DESCRIPTION OF THE DRAWINGS

FIG. 1 is a schematic diagram of a communications system applicable to this application;

FIG. 2 is a schematic diagram of an SCG configuration method according to this application;

DETAILED DESCRIPTION OF ILLUSTRATIVE EMBODIMENTS

Figure 3A:
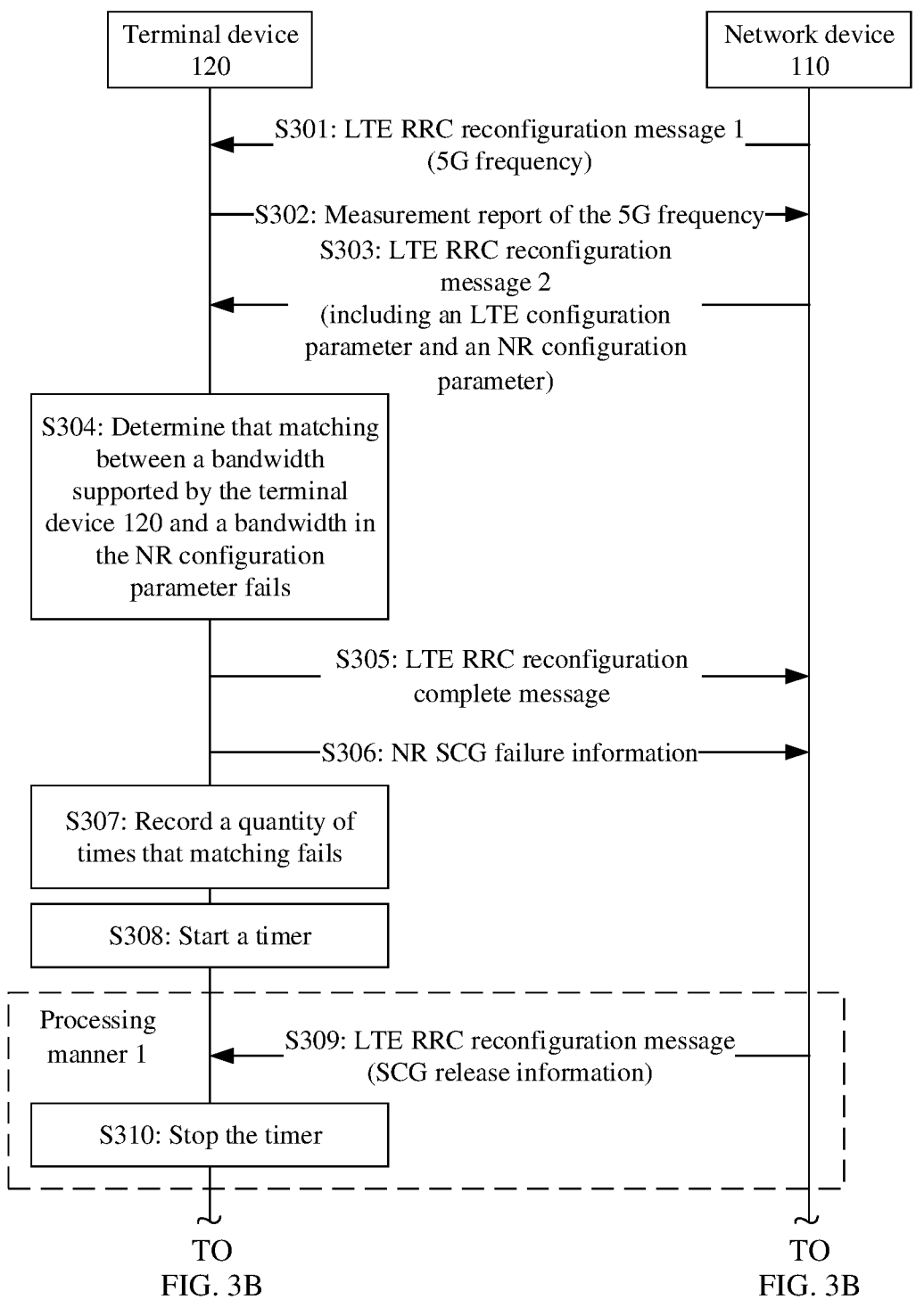
FIG. 3A and FIG. 3B are a schematic diagram of another SCG configuration method according to this application.

The following describes technical solutions of this application with reference to the accompanying drawings.

An application scenario of this application is first described. FIG. 1 is a schematic diagram of a communications system applicable to this application.

A communications system 100 includes a network device no and a terminal device 120. The terminal device 120 communicates with the network device 110 by using an electromagnetic wave.

In this application, the terminal device 120 may include various handheld devices, vehicle-mounted devices, or wearable devices that have a wireless communication function, for example, user equipment (user equipment, UE) and a mobile station (mobile station, MS) defined in a 3rd generation partnership project (3rd generation partnership project, 3GPP).

The network device no may be a base station defined in the 3GPP, for example, a base station (gNB) in a 5th generation (the fifth generation, 5G) communications system. The network device no may alternatively be a relay station, an access point, a vehicle-mounted device, a wearable device, or another type of communications device.

The communications system 100 is merely an example for description, and the communications system applicable to this application is not limited thereto. For example, the communications system 100 includes more network devices.

The network device 110 and the terminal device 120 each support both a 4G network and a 5G network. When the network device no and the terminal device 120 perform NSA networking, an SCG may be added by using the 4G network, to activate the 5G network. The following describes in detail an SCG configuration method provided in this application.

FIG. 2 is a schematic diagram of an SCG configuration method according to this application.

A terminal device 120 establishes a 4G network—based RRC connection to a network device no. When the network device no determines that the terminal device 120 has a 5G capability, the network device no may configure a 5G frequency for the terminal device 120 by using an LTE RRC reconfiguration message 1, and the terminal device 120 measures the 5G frequency based on the LTE RRC reconfiguration message 1, to determine whether the 5G frequency is supported. After measurement is completed, the terminal device 120 reports a measurement report (that is, a measurement report of an NR cell or an SCG) of the 5G frequency.

For example, when the network device no configures the terminal device 120 to measure a frequency channel number 509166, content of the LTE RRC reconfiguration message 1 is shown as follows:

```
MeasObjectToAddMod
    measObjectId:2,0×2
    measObject
        measObjectNR-r15
            carrierFreq-r15:519000,0×7eb58
            rs-ConfigSSB-r15
                measTimingConfig-r15
                    periodicityAndOffset-r15
                        sf20-r15:18, 0×12
                    ssb-Duration-r15:sf5(4,0×4)
                subcarrierSpacingSSB-r15:kHz30(1, 0×1)
            quantityConfigSet-15:1, 0×1
            groupExtension-r15
                bandNR-r15
                    setup:38,0×26
```

In the message, carrierFreq-r15 indicates a to-be-measured 5G frequency.

The measurement report of the 5G frequency may include a physical cell identifier (physical cell identifier, PCI) and signal strength of a 5G network. The measurement report of the 5G frequency may include the following content.

```
measurementReport-r8
  measResults
    measId:3, 0×3
    measResultPCell
      rsrpResult:64, 0×40
      rsrqResult:32, 0×20
    measResultNeighCells
      measResultNeighCellListNR-r15
        MeasResultCellListNR-r15
          pci-r15:11, 0×b
          measResultCell-r15
            rsrpResult-r15:88, 0×58
            rsrqResult-r15:66, 0×42
```

After receiving the measurement report, the network device no sends an LTE RRC reconfiguration message 2 to the terminal device 120. The LTE RRC reconfiguration message 2 includes the 5G frequency and a 5G bandwidth corresponding to the 5G frequency. Then, the terminal device 120 may perform the following step.

S210: Receive an LTE RRC reconfiguration message, where the LTE RRC reconfiguration message includes an NR configuration parameter, and the NR configuration parameter is used to configure an SCG.

The LTE RRC reconfiguration message in S210 is the LTE RRC reconfiguration message 2. The LTE RRC reconfiguration message is, for example, RRCConnectionReconfiguration, and the NR configuration parameter is, for example, nr-SecondaryCellGroupConfig. RRCConnectionReconfiguration including nr-SecondaryCellGroupConfig is shown as follows:

```
nonCriticalExtension
  nr-Config-r15
    setup-nr-config-r15
      endc-ReleaseAndAdd-r15:FALSE
      nr-SecondaryCellGroupConfig-r15:08 81
      85 5C 40 B0 44 31 C5 5F C8 12 0D C4
E8 0F 84 28 10 20 F3 6C 04 1A DD 3A 77 18
16 D1 FA D6 00 4A 3F 21
      p-MaxEUTRA-r15:23,0×17
      sk-Counter-r15:0,0×0
      nr-RadioBearerConfig2-r15:14 09 28 9F
8F C5 37 4D 83
```

If received RRCConnectionReconfiguration includes nr-SecondaryCellGroupConfig, the terminal device 120 may perform an NR RRC reconfiguration process. The NR RRC reconfiguration process is shown in clause (clause) 5.3.5.3 of communications standard TS 38.331 (version f70).

Based on a stipulation in clause 5.3.5.3 of TS 38.331 (version f70), if the RRC reconfiguration message includes SCG information, the terminal device 120 may perform an SCG cell group configuration based on the stipulation in clause 5.3.5.5 of TS 38.331 (version f70).

Before adding the SCG, the terminal device 120 needs to determine whether the terminal device 120 supports a 5G bandwidth indicated in nr-SecondaryCellGroupConfig.

A field FrequencyInfoDL in nr-SecondaryCellGroupConfig includes frequency information and bandwidth information of the NR cell.

A format of the field FrequencyInfoDL is as follows:

```
FrequencyInfoDL ::=          SEQUENCE {
  absoluteFrequency SSB      ARFCN-ValueNR
OPTIONAL, -- Cond SpCellAdd
  frequencyBandList          MultiFrequencyBandListNR,
  absoluteFrequencyPointA    ARFCN-ValueNR,
  scs-SpecificCarrierList        SEQUENCE (SIZE
                             (1 . . . maxSCSs) ) OF SCS-
SpecificCarrier,
  . . .
}
```

In the field, absoluteFrequencySSB represents a center frequency of the NR cell, namely, the 5G frequency. The following provides an example of determining the 5G bandwidth. For example, nr-SecondaryCellGroupConfig includes the following information:

```
spCellConfigCommon
  physCellId:11, 0×b
  downlinkConfigCommon
    frequency InfoDL
      absoluteFrequencySSB:519000, 0×7eb58
      frequencyBandList
        FreqBandIndicatorNR:38, 0×26
      absoluteFrequencyPointA:517164, 0×7e42c
      scs-SpecificCarrierList
        SCS-SpecificCarrier
          offsetToCarrier:0, 0×0
          subcarrierSpacing:kHz30(1, 0×1)
          carrierBandwidth:51, 0×33
```

In the content, subcarrierSpacing represents a subcarrier spacing, and a value is 30 kHz; and carrierBandwidth represents a carrier bandwidth, and a value 51 indicates that the carrier bandwidth includes 51 resource blocks (resource block, RB). Each RB includes 12 subcarriers, and it may be determined, based on 51*12*30 kHz, that the carrier bandwidth is 18360 kHz. That is, the 5G bandwidth indicated in nr-SecondaryCellGroupConfig is 18.36 MHz.

If the terminal device 120 does not support the 5G bandwidth indicated in nr-SecondaryCellGroupConfig, the terminal device 120 may perform the following step.

S220: Send indication information when the terminal device 120 does not support a configuration of the SCG, where the indication information is used to indicate that the SCG is abnormal.

That the terminal device 120 does not support the SCG may be explained as follows: The terminal device 120 cannot perform communication by using the 5G bandwidth indicated in nr-SecondaryCellGroupConfig, or an NR capability of the terminal device 120 does not match an NR capability configured by the network device 110. In this case, the terminal device 120 cannot configure the SCG. Therefore, the terminal device 120 may send the indication information to the network device 110, to indicate that the SCG is abnormal. That is, matching of a combination of an LTE cell and an NR cell corresponding to the SCG fails.

The indication information is, for example, NR SCG failure information (SCG_FAILURE_INFO_NR). The NR SCG failure information is used to provide information that is detected by UE and that is related to an NR SCG failure. Content of the NR SCG failure information is as follows:

```
-- ASNISTART
-- TAG-SCGFAILUREINFORMATION-START
SCGFailureInformation ::=             SEQUENCE {
  criticalExtensions           CHOICE {
```

-continued

| | |
|---|---|
| scgFailureInformation | SCGFailureInformation-IEs, |
| criticalExtensionsFuture | SEQUENCE { } |
| } | |
| } | |
| SCGFailureInformation-IEs ::= | SEQUENCE { |
| failureReportSCG | FailureReportSCG OPTIONAL, |
| nonCriticalExtension | SEQUENCE { } OPTIONAL |
| } | |

The NR SCG failure information is currently existing information, but is not applied to a scenario in which configuring an NR SCG by using the LTE RRC reconfiguration message fails. The existing information is used to indicate that the SCG is abnormal in the scenario, without a need to design new information, to help reduce communication complexity.

After receiving the indication information, if the network device no determines that the terminal device 120 needs to release the SCG, the network device no may send an SCG release message to the terminal device 120. After releasing the SCG, the terminal device 120 does not need to send a 4G network re-establishment request again, to avoid frequently re-establishing a 4G network connection, or reduce a quantity of times of frequently re-establishing a 4G network connection, and improve network connection quality.

Figure 3B:
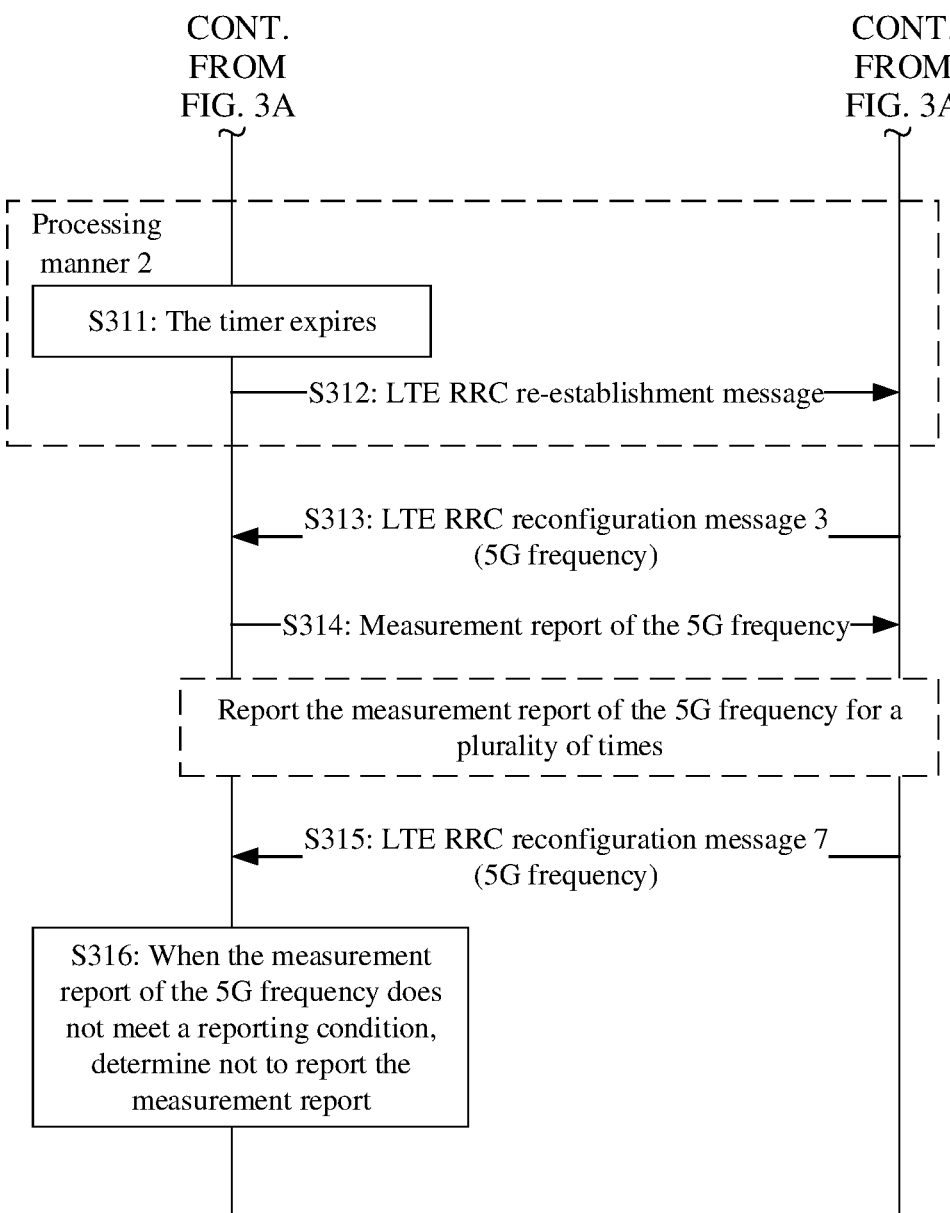

With reference to FIG. 3A and FIG. 3B, the following further describes an SCG configuration method provided in this application.

S301: A network device no sends an LTE RRC reconfiguration message (RRC_CONN_RECFG) 1 to a terminal device 120, where the message carries a to-be-measured 5G frequency.

S302: After completing measurement of the 5G frequency, the terminal device 120 sends a measurement report to the network device 110.

S303: The network device no sends an LTE RRC reconfiguration message (RRC CONN RECFG) 2 to the terminal device 120, where the message includes an LTE configuration parameter and an NR configuration parameter, and the NR configuration parameter is used to configure an SCG.

S304: The terminal device 120 determines that matching between a bandwidth supported by the terminal device 120 and a bandwidth in the NR configuration parameter fails. In other words, the terminal device 120 does not support a 5G bandwidth in the NR configuration parameter.

S305: The terminal device 120 sends an LTE RRC reconfiguration complete message (RRC_CONN_RECFG_CMP) to the network device 110.

S306: The terminal device 120 sends NR SCG failure information (SCG_FAILURE_INFO_NR) to the network device 110.

S307: The terminal device 120 records a quantity of times that matching between the bandwidth supported by the terminal device 120 and the bandwidth in the NR configuration parameter fails, and when the quantity of times is greater than or equal to a first threshold, determines not to report a measurement report of the SCG any longer.

Figure 4:
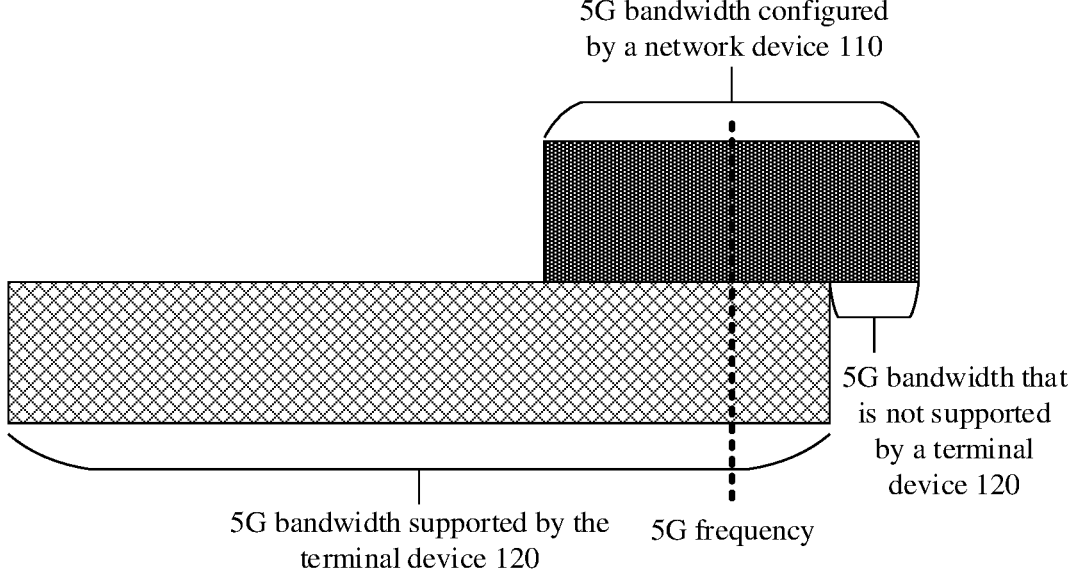
FIG. 4 is a schematic diagram in which matching between an LTE cell and an NR cell fails according to this application.

FIG. 4 is a schematic diagram in which matching between a bandwidth supported by a terminal device 120 and a bandwidth in an NR configuration parameter fails.

A 5G frequency configured by the network device no falls within a bandwidth range supported by the terminal device 120. However, a 5G bandwidth configured based on the 5G frequency exceeds the bandwidth range supported by the terminal device 120. Therefore, the terminal device 120 supports the 5G frequency configured in the LTE RRC reconfiguration message 1, but matching between the bandwidth supported by the terminal device 120 and the bandwidth in the NR configuration parameter fails, the NR cell cannot be configured as an SCG of the terminal device 120 (in other words, matching between an LTE cell and an NR cell corresponding to a 5G frequency indicated in the NR configuration parameter fails).

The terminal device 120 may record combination information of the LTE cell and the NR cell, and determine, based on the combination information, a quantity of times that matching between the LTE cell and the NR cell fails. The combination information includes: at least one piece of information of a frequency band ID, a frequency ID, and a physical cell ID of the LTE cell, and at least one piece of information of a frequency band ID, a frequency ID, and a physical cell ID of the NR cell.

The terminal device 120 may alternatively determine, based on other information, the quantity of times that matching between the LTE cell and the NR cell fails. For example, the terminal device 120 records an ID of a 5G frequency in an NR parameter and an ID of a public land mobile network (public land mobile network, PLMN) to which the network device no belongs, and determines, based on the ID of the 5G frequency and the ID of the PLMN, the quantity of times that matching between the LTE cell and the NR cell fails. A specific manner in which the terminal device 120 determines a quantity of times that matching of a combination of the LTE cell and the NR cell fails is not limited in this application.

S305, S306, and S307 may be performed simultaneously, or may be performed separately. When the three steps are performed separately, an execution sequence of S305, S396, and S397 is not limited.

S398: The terminal device 120 starts a timer, and waits to receive SCG release information sent by the network device 110.

The timer may be started immediately after the NR SCG failure information is sent, or may be started after a period of time after the NR SCG failure information is sent. The terminal device may flexibly set, by using the timer, a time period for waiting for the SCG release information.

Based on a receiving status of the SCG release message, the terminal device 120 has the following two optional processing manners.

Processing manner 1: The SCG release information is received before the timer expires.

S309: The terminal device 120 receives the LTE RRC reconfiguration message (RRC_CONN_RECFG) from the network device 110, where the LTE RRC reconfiguration message includes the SCG release information.

S310: The terminal device 120 stops the timer.

Processing manner 2: No SCG release information is received when the timer expires.

S311: The timer expires.

S312: The terminal device 120 sends an LTE RRC re-establishment message to the network device 110, to restore a 4G network connection.

After the terminal device sends indication information, the network device requires a specific period of time for making a decision. Therefore, signaling overheads can be reduced if the terminal device does not send the LTE RRC re-establishment message in a target time period. If the terminal device still receives no SCG release message after the target time period, there is a possibility that the network device does not make a decision in a timely manner because the network device has a busy task. The terminal device may send the LTE RRC re-establishment message to the network device, to restore the 4G network connection as soon as possible, and reduce impact exerted on communication when the SCG is abnormal.

There are a plurality of reasons for an NR SCG configuration failure. Therefore, after receiving the NR SCG failure information (SCG_FAILURE_INFO_NR), the network device no cannot determine that a reason for the NR SCG configuration failure is that the terminal device 120 does not support the 5G bandwidth. Therefore, the network device no may configure an NR SCG for the terminal device again, that is, perform S313.

S313: The network device no sends an LTE RRC reconfiguration message 3 to the terminal device 120, where the message carries a to-be-measured 5G frequency. The 5G frequency is the same as the 5G frequency in the LTE RRC reconfiguration message 1.

The terminal device 120 may measure the 5G frequency again, and generate a measurement report. The terminal device 120 may determine, based on the quantity of times that matching between the bandwidth supported by the terminal device 120 and the bandwidth in the NR configuration parameter fails, whether to report the measurement report. If the quantity of times is less than the first threshold, the terminal device 120 may report the measurement report of the 5G frequency again. If the quantity of times is greater than or equal to the first threshold, the terminal device 120 determines not to report the measurement report of the 5G frequency any longer.

For example, if matching fails for the first time in S304 and the first threshold is 4, the terminal device 120 may report the measurement report of the 5G frequency for two times again, that is, perform S314. When the network device no configures, for a fourth time, the terminal device 120 to measure the 5G frequency, the network device no performs S315, to send an LTE RRC reconfiguration message 7 to the terminal device 120. The message carries a to-be-measured 5G frequency, and the 5G frequency is the same as the 5G frequency in the LTE RRC reconfiguration message 1.

After generating the measurement report of the 5G frequency, the terminal device 120 may perform the following step.

S316: When determining that the measurement report of the 5G frequency does not meet a reporting condition, the terminal device 120 determines not to report the measurement report.

In this case, the terminal device 120 stops reporting the measurement report, to prevent the network device no from reconfiguring the NR SCG, so as to avoid frequently re-establishing the 4G network connection, or reduce a quantity of times of frequently re-establishing the 4G network connection, and improve network connection quality.

Optionally, when the network device no configures, for the fourth time, the terminal device 120 to measure the 5G frequency, the terminal device 120 may no longer measure the 5G frequency, to reduce power consumption.

The foregoing describes in detail an example of the SCG configuration method provided in this application. It can be understood that, to implement the foregoing functions, a corresponding apparatus includes a corresponding hardware structure and/or software module for performing the functions. A person skilled in the art should be easily aware that units, algorithms, and steps in the examples described with reference to embodiments disclosed in this specification can be implemented in a form of hardware or a combination of hardware and computer software in this application. Whether a function is performed by using hardware or hardware driven by computer software depends on a particular application and design constraint of the technical solutions. A person skilled in the art may use different methods to implement the described functions for each particular application, but it should not be considered that the implementation goes beyond the scope of this application.

In this application, the SCG configuration apparatus may be divided into functional units based on the foregoing method examples. For example, each function may be divided into functional units, or two or more functions may be integrated into one unit. The integrated unit may be implemented in a form of hardware, or may be implemented in a form of a software functional unit. It should be noted that, in this application, division into the units is an example, and is merely a logical function division. In an actual implementation, another division manner may be used.

Figure 5:
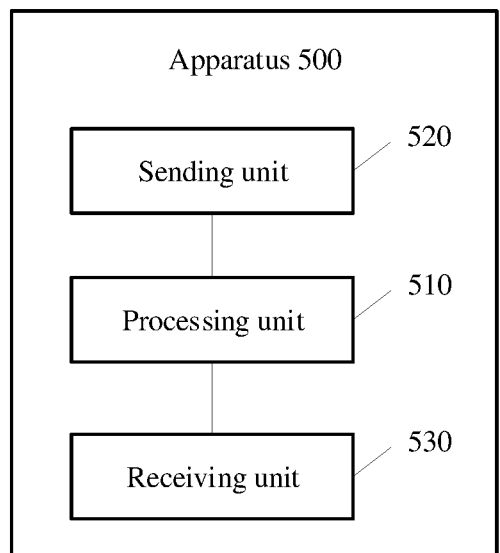
FIG. 5 is a schematic diagram of an SCG configuration apparatus according to this application.

FIG. 5 is a schematic diagram of a structure of an SCG configuration apparatus according to this application. An apparatus 500 includes a processing unit 510, a sending unit 520, and a receiving unit 530. The sending unit 520 can perform a sending operation under control of the processing unit 510, and the receiving unit 530 can perform a receiving operation under control of the processing unit 510.

The receiving unit 530 is configured to receive an LTE RRC reconfiguration message. The LTE RRC reconfiguration message includes an NR configuration parameter, and the NR configuration parameter is used to configure an SCG.

The processing unit 510 is configured to send, by using the sending unit 520, indication information when a terminal device does not support a configuration of the SCG. The indication information is used to indicate that the SCG is abnormal.

Optionally, the processing unit 510 is further configured to: release the SCG when the receiving unit 530 receives an SCG release message in a target time period; or send, by using the sending unit 520, an LTE RRC re-establishment message when the receiving unit 530 does not receive an SCG release message in a target time period.

Optionally, the target time period is a time period corresponding to a timer started after the indication information is sent.

Optionally, that the apparatus 500 does not support a configuration of the SCG includes: matching between a bandwidth supported by the apparatus 500 and a bandwidth in the NR configuration parameter fails.

Optionally, the processing unit 510 is further configured to: when a quantity of times that matching between the bandwidth supported by the apparatus 500 and the bandwidth in the NR configuration parameter fails is greater than or equal to a first threshold, determine not to report a measurement report of the SCG any longer.

Optionally, the processing unit 510 is further configured to determine, based on combination information, a quantity of times that matching of a combination fails. The combination information includes: at least one piece of information of a frequency band ID, a frequency ID, and a physical cell ID of an LTE cell, and at least one piece of information of a frequency band ID, a frequency ID, and a physical cell ID of an NR cell.

Optionally, the indication information is NR SCG failure information.

For a specific manner in which the apparatus 500 performs the SCG configuration method and a generated beneficial effect, refer to related descriptions in the method embodiments.

Figure 6:
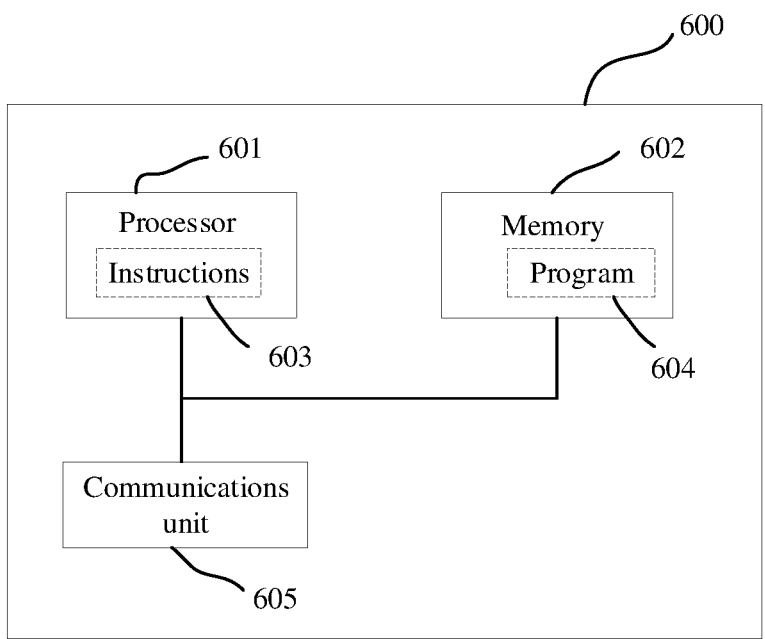
FIG. 6 is a schematic diagram of another SCG configuration apparatus according to this application.

FIG. 6 is a schematic diagram of a structure of an SCG configuration electronic device according to this application. A dashed line in FIG. 6 indicates that a unit or a module is optional. A device 600 may be configured to implement the method described in the method embodiments. The device 600 may be a terminal device or a chip.

The device 600 includes one or more processors 601. The one or more processors 601 may support the device 600 to implement the method in the method embodiments. The processor 601 may be a general-purpose processor or a dedicated processor. For example, the processor 601 may be a central processing unit (central processing unit, CPU). The CPU may be configured to: control the device 600, execute a software program, and process data of the software program. The device 600 may further include a communications unit 605, configured to implement a signal input (receiving) and/or a signal output (sending).

For example, the device 600 may be a chip, and the communications unit 605 may be an input circuit and/or an output circuit of the chip. Alternatively, the communications unit 605 may be a communications interface of the chip, and the chip may be used as a component of the terminal device or another electronic device.

For another example, the device 600 may be a terminal device, and the communications unit 605 may be a transceiver of the terminal device, or the communications unit 605 may be a transceiver circuit of the terminal device.

The device 600 may include one or more memories 602. The memory 602 stores a program 604. The program 604 may be run by the processor 601, to generate instructions 603, so that the processor 601 performs, according to the instructions 603, the method described in the method embodiments. Optionally, the memory 602 may further store data (for example, a quantity of times of measuring a 5G frequency). Optionally, the processor 601 may further read the data stored in the memory 602. The data and the program 604 may be stored at a same storage address, or the data and the program 604 may be stored at different storage addresses.

The processor 601 and the memory 602 may be separately disposed, or may be integrated together, for example, integrated on a system on chip (system on chip, SOC) of the terminal device.

For a specific manner in which the processor 601 performs the method embodiments, refer to related descriptions in the method embodiments.

It should be understood that steps in the method embodiments may be implemented by using a logic circuit in a form of hardware in the processor 601 or an instruction in a form of software. The processor 601 may be a CPU, a digital signal processor (digital signal processor, DSP), an application-specific integrated circuit (application-specific integrated circuit, ASIC), a field programmable gate array (field programmable gate array, FPGA) or another programmable logic device, for example, a discrete gate or transistor logic device, or a discrete hardware component.

This application further provides a computer program product. When the computer program product is executed by the processor 601, the method described in any method embodiment of this application is implemented.

The computer program product may be stored in a memory 602, for example, a program 604. After processing processes such as preprocessing, compilation, assembling, and linking are performed on the program 604, the program 604 is finally converted into an executable target file that can be executed by the processor 601.

This application further provides a computer-readable storage medium. The computer-readable storage medium stores a computer program. When the computer program is executed by a computer, the method described in any method embodiment of this application is implemented. The computer program may be a high-level language program, or may be an executable target program.

The computer-readable storage medium is, for example, a memory 602. The memory 602 may be a volatile memory or a nonvolatile memory, or the memory 602 may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example rather than limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It may be clearly understood by a person skilled in the art that, for the purpose of convenient and brief description, for a detailed working process and a generated technical effect of the foregoing apparatus and device, refer to a corresponding process and technical effect in the method embodiments. Details are not described herein again.

In the several embodiments provided in this application, the disclosed system, apparatus, and method may be implemented in another manner. For example, some features of the method embodiments may be ignored or not performed. The apparatus embodiments are merely an example. Division into the units is merely logical function division and may be other division in an actual implementation. A plurality of units or components may be combined or integrated into another system. In addition, a coupling between units or a coupling between components may be a direct coupling or an indirect coupling. The couplings include an electrical connection, a mechanical connection, or a connection in another form.

Sequence numbers do not mean execution sequences in various embodiments of this application. The execution sequences of the processes should be determined based on functions and internal logic of the processes, and should not be construed as any limitation on the implementation processes of embodiments of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

In conclusion, the foregoing descriptions are merely example embodiments of the technical solutions of this application, but are not intended to limit the protection scope of this application. Any modification, equivalent replacement, improvement, or the like made without departing from the principle of this application shall fall within the protection scope of this application.

What is claimed is:

1. A method comprising:
receiving, by a terminal device, a long term evolution (LTE) radio resource control (RRC) reconfiguration message, wherein the LTE RRC reconfiguration message comprises a new radio (NR) configuration parameter, and the NR configuration parameter configures a secondary cell group (SCG); and
when the terminal device does not support a configuration of the SCG, sending, by the terminal device, indication information indicating that the SCG is abnormal, wherein the terminal device does not support the configuration of the SCG when determining that a bandwidth supported by the terminal device does not match a bandwidth in the NR configuration parameter.

2. The method according to claim 1, further comprising:
releasing, by the terminal device, the SCG when the terminal device receives an SCG release message in a target time period; or
sending, by the terminal device, an LTE RRC re-establishment message when the terminal device does not receive the SCG release message in the target time period.

3. The method according to claim 2, wherein the target time period is a time period corresponding to a timer started after the indication information is sent.

4. The method according to claim 1, further comprising:
when a quantity of times that matching between the bandwidth supported by the terminal device and the bandwidth in the NR configuration parameter fails is greater than or equal to a first threshold, determining, by the terminal device, not to report a measurement report of the SCG.

5. The method according to claim 4, further comprising:
determining, by the terminal device based on combination information, the quantity of times, wherein the combination information comprises:
at least one of a frequency band identifier (ID), a frequency ID, or a physical cell ID of an LTE cell; and
at least one of a frequency band ID, a frequency ID, or a physical cell ID of an NR cell.

6. The method according to claim 1, wherein the indication information is NR SCG failure information.

7. The method according to claim 1, wherein the NR configuration parameter comprises frequency information and bandwidth information of an NR cell.

8. An apparatus, comprising at least one processor and a non-transitory memory, wherein the memory stores a computer program, which when executed by the at least one processor, causes the apparatus to perform:
receiving a long term evolution (LTE) radio resource control (RRC) reconfiguration message, wherein the LTE RRC reconfiguration message comprises a new radio (NR) configuration parameter, and the NR configuration parameter configures a secondary cell group (SCG); and
when the apparatus does not support a configuration of the SCG, sending indication information indicating that the SCG is abnormal, wherein the apparatus does not support the configuration of the SCG when a bandwidth supported by the apparatus does not match a bandwidth in the NR configuration parameter.

9. The apparatus according to claim 8, wherein the apparatus is further caused to perform:
releasing the SCG when the apparatus receives an SCG release message in a target time period; or
sending an LTE RRC re-establishment message when the apparatus does not receive the SCG release message in the target time period.

10. The apparatus according to claim 9, wherein the target time period is a time period corresponding to a timer started after the indication information is sent.

11. The apparatus according to claim 8, wherein the apparatus is further caused to:
when a quantity of times that matching between the bandwidth supported by the apparatus and the bandwidth in the NR configuration parameter fails is greater than or equal to a first threshold, determining not to report a measurement report of the SCG.

12. The apparatus according to claim 11, wherein the apparatus is further caused to perform:
determining, based on combination information, the quantity of times, wherein the combination information comprises:
at least one of a frequency band identifier (ID), a frequency ID, or a physical cell ID of an LTE cell; and
at least one of a frequency band ID, a frequency ID, or a physical cell ID of an NR cell.

13. The apparatus according to claim 8, wherein the indication information is NR SCG failure information.

14. The apparatus according to claim 8, wherein the apparatus is a terminal device.

15. The apparatus according to claim 8, wherein the apparatus is a chip in a terminal device.

16. A non-transitory computer-readable storage medium comprising a computer program, which when executed by a processor of a device, causes the device to perform:
receiving a long term evolution (LTE) radio resource control (RRC) reconfiguration message, wherein the LTE RRC reconfiguration message comprises a new radio (NR) configuration parameter, and the NR configuration parameter configures a secondary cell group (SCG); and
when the device does not support a configuration of the SCG, sending indication information indicating that the SCG is abnormal, wherein the device does not support the configuration of the SCG when a bandwidth supported by the device does not match a bandwidth in the NR configuration parameter.

17. The non-transitory computer-readable storage medium according to claim 16, wherein the device is further caused to perform:
releasing the SCG when the device receives an SCG release message in a target time period; or
sending an LTE RRC re-establishment message when the device does not receive the SCG release message in the target time period.

18. The non-transitory computer-readable storage medium according to claim 17, wherein the target time period is a time period corresponding to a timer started after the indication information is sent.

19. The non-transitory computer-readable storage medium according to claim 16, wherein the device is further caused to perform:
when a quantity of times that matching between the bandwidth supported by the device and the bandwidth in the NR configuration parameter fails is greater than or equal to a first threshold, determining not to report a measurement report of the SCG.

20. The non-transitory computer-readable storage medium according to claim 19, wherein the device is further caused to perform:

determining, based on combination information, the quantity of times, wherein the combination information comprises:

at least one of a frequency band identifier (ID), a frequency ID, or a physical cell ID of an LTE cell; and at least one of a frequency band ID, a frequency ID, or a physical cell ID of an NR cell.

* * * * *